June 23, 1970

G. L. GATCHET ET AL 3,516,811

METHOD OF AND APPARATUS FOR COATING GLASSWARE
RETAINING ITS HEAT OF FORMATION

Filed Oct. 4, 1966

INVENTORS
GEORGE L. GATCHET
MATTHEW J. DECKER
BY
Clinton L. Mathis
ATTORNEY

June 23, 1970  G. L. GATCHET ET AL  3,516,811
METHOD OF AND APPARATUS FOR COATING GLASSWARE
RETAINING ITS HEAT OF FORMATION
Filed Oct. 4, 1966  3 Sheets-Sheet 2
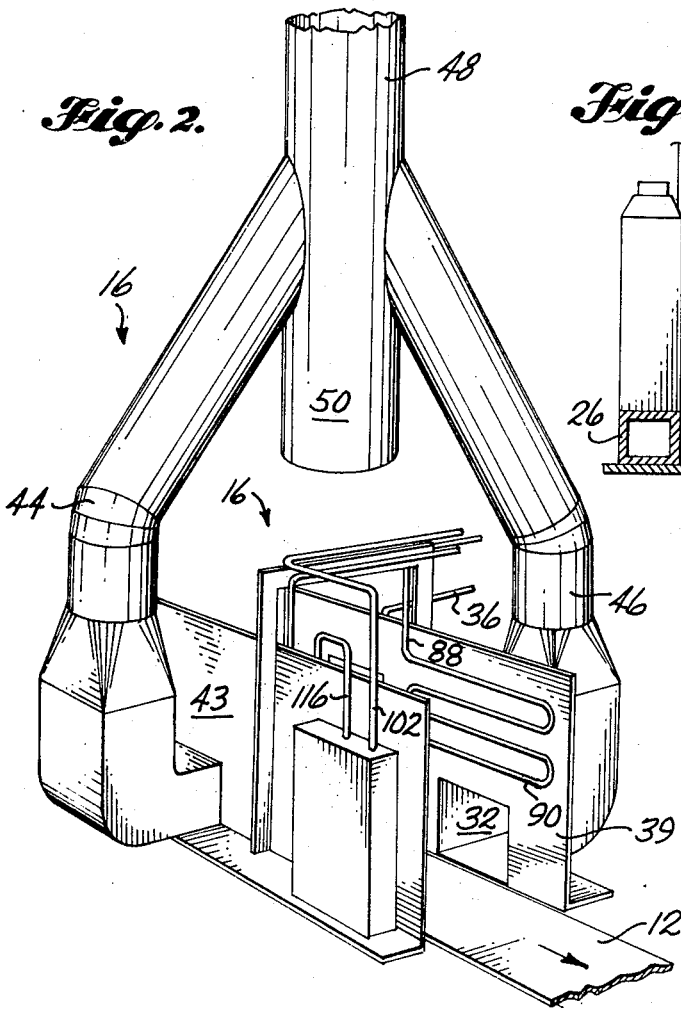
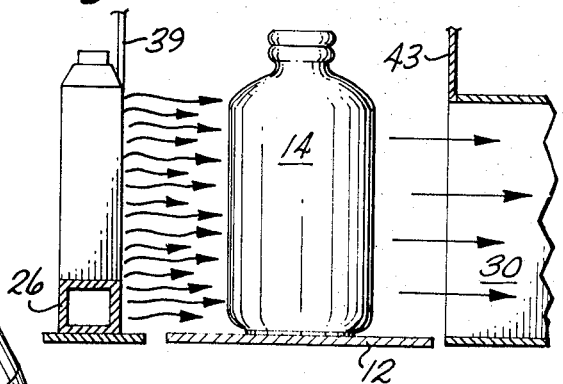
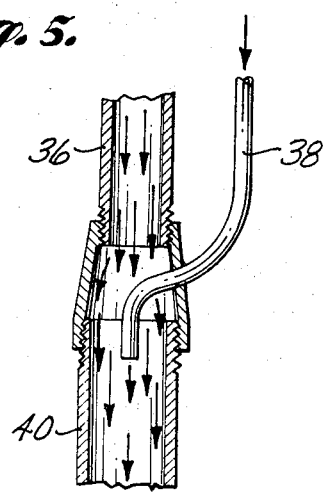
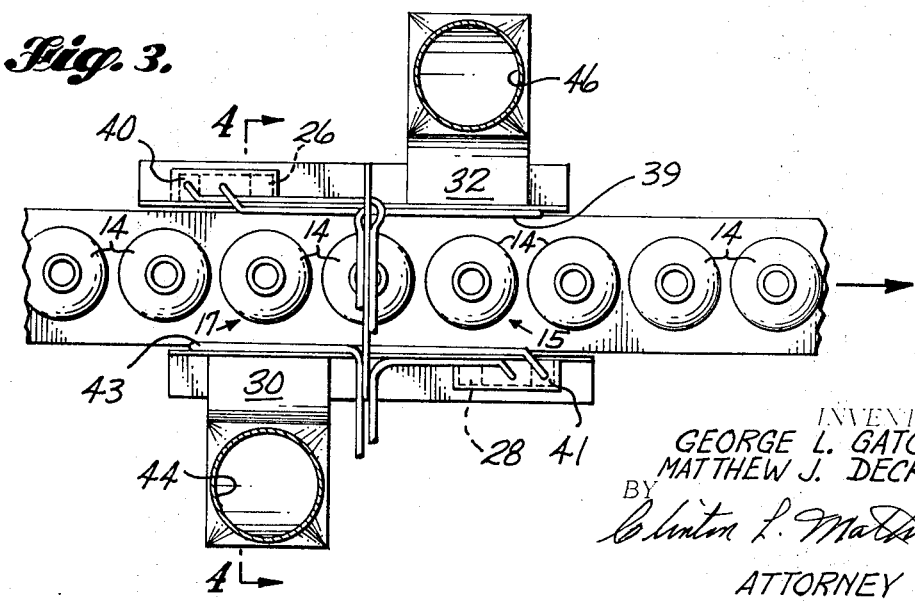
INVENTORS
GEORGE L. GATCHET
MATTHEW J. DECKER
BY
ATTORNEY

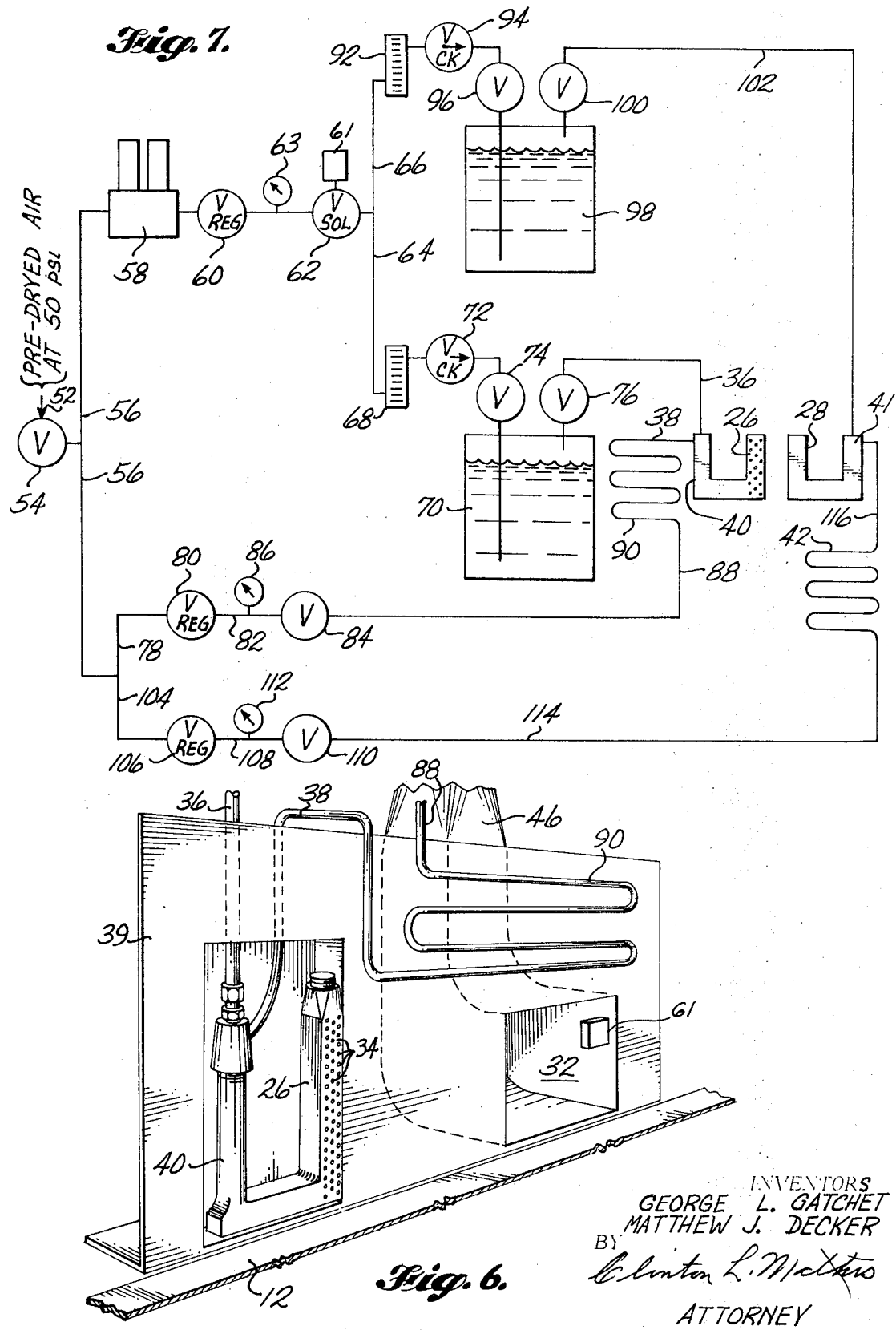

United States Patent Office 3,516,811
Patented June 23, 1970

3,516,811
METHOD OF AND APPARATUS FOR COATING GLASSWARE RETAINING ITS HEAT OF FORMATION
George L. Gatchet, Bainbridge Island, and Matthew J. Decker, Seattle, Wash., assignors to Indian Head, Inc., New York, N.Y., a corporation of Delaware
Filed Oct. 4, 1966, Ser. No. 584,244
Int. Cl. C03c *17/00, 25/02*
U.S. Cl. 65—60                                     11 Claims

ABSTRACT OF THE DISCLOSURE

This invention relates to the selective external surface coating of glassware having body, neck, shoulder, and finish portions while said glassware retains therein its heat of formation. A fluid stream, comprising a heat decomposible metallic compound and air, is sprayed horizontally from a fixed first station. The glassware is moved past this fixed first station; and the fluid stream is caused to envelop and move in a laminar flow pattern in close proximity to the external surface of the glassware by the retaining action of a negative pressure outlet being alined with the horizontal flow so as to coat the body portion, to limit the coating of the neck and shoulder portions, and to avoid all coating of the finish portion thereof. After coating one side of the glassware by the foregoing process, then the other side is similarly coated. Also, there is disclosed the use of two initially separate fluid streams, one of which comprises anhydrous stannic chloride and air dried to a relatively low dew point and the other stream comprising relatively wet air of larger volume and heated to an elevated temperature just prior to mixing with the first stream. Particular methods of heating are disclosed utilizing the heat of formation retained in the glassware, this heat being utilized in connection with a heat sensing element to control the operation of the apparatus.

---

This invention relates to the selective external surface coating of glassware. More particularly, this invention relates to the precise control of the external coating at the "hot" end of glassware manufacture, which glassware is subsequently and generally almost immediately subjected to fire finishing and/or annealing lehr treatment.

Glassware manufacturers, and ultimately the users of their products, have always been concerned with the fundamental properties of their glassware and to a very substantial degree, the external surface of such glassware. Such parties know, generally, that the intrinsic tensile strength of glass is in excess of 1,000,000 pounds per square inch, but because of probable external surface damage, a limit of 3,000 pounds per square inch is necessary in designing glassware for service as pressure bottles, such as those used in the carbonated drink and beer industries. The glassware manufacturer is aware that external surface damage of his product in the form of abrasions, bruises, and scratches is the cause for the loss of tensile strength of the glassware. It is an object of this invention to preserve the pristine surface of the glassware by providing a metallic coating or bond selectively located and applied at the "hot" end during the manufacture of glassware.

It is a further object of this invention to provide a selectively controlled and precisely located basic or primary bond at the "hot" end during manufacture of glassware to which bond any of the known coatings or bonds may be applied at the "cold" end during manufacture of the glassware.

There are two suitable locations on a conventional glass manufacturing line at which protective coatings or bonds can be applied to glassware. The first is between the forming machine and the annealing lehr—referred to as the "hot" end; the second, on the packing or discharge end of the lehr, referred to as the "cold" end. At the said "hot" end, the glassware retains sufficient heat of formation to maintain the temperature of the glassware above about 800° F.

The coatings applied at the "hot" end not only utilize the latent heat of formation retained in the glassware in applying or depositing the coating but such coating must withstand and not be adversely affected by the heat applied during fire finishing and during lehr annealing. After the glassware is discharged at the "cold" end of the lehr, then a second coat or bond is applied to the exterior surface and the material to be applied need not utilize heat in its application. Such coating at the "cold" end need not be one to have properties to withstand adverse reaction to the application of substantial heat during flame finishing or lehr annealing.

Thus, the coating or bonding material to be utilized at the "cold" end may be selected from a very large group of materials. They are selected to provide proper "lubricity"; "labelability"; bonding and adherence to the bond provided at the "hot" end; wear resistance; corrosion resistance; and other desirable properties.

Some of the prior art patents teaching the character and nature of the bonding agent to be applied at both the "hot" and "cold" ends include:

French Pat. No. 1,400,917 issued to Ball Brothers Company Inc.
British Pat. No. 980,287 issued to Ball Brothers Company Inc.
U.S. Pat. No. 3,161,536 issued to E. I. du Pont de Nemours and Company, as assignee.
U.S. Pat. No. 3,161,531 issued to E. I. du Pont de Nemours and Company, as assignee.
U.S. Pat. No. 3,161,534 issued to E. I. du Pont de Nemours and Company, as assignee.
U.S. Pat. No. 3,119,852 issued to E. I. du Pont de Nemours and Company, as assignee.
U.S. Pat. No. 3,051,593 issued to E. I. du Pont de Nemours and Company, as assignee.
U.S. Pat. No. 2,831,780 issued to Deyrup.
U.S. Pat. No. 3,249,246 issued to Ball Brothers Company Incorporated, as assignee.
British Pat. No. 995,117 issued to American Can Company, as assignee.
U.S. Pat. No. 2,995,533 issued to Owens-Illinois Glass Company, as assignee.
U.S. Pat. No. 3,051,593 issued to E. I. du Pont de Nemours and Company, as assignee.
U.S. Pat. No. 2,831,780 issued to E. I. du Pont de Nemours and Company, as assignee.
U.S. Pat. No. 2,813,045 issued to Owens-Illinois Glass Company, as assignee.
U.S. Pat. No. 2,926,101 issued to Owens-Illinois Glass Company, as assignee.
U.S. Pat. No. 2,132,138 issued to The Ironsides Company, as assignee.

In view of the foregoing, no novelty is claimed in the exact formulation of the coating formulation applied at the "cold" end and hence, only a general disclosure of an example of bond or coating agent applied at the "cold" end will be given, and then only by way of example and not as a limitation. A coating formulation employed was obtained from Ball Brothers Company Incorporated and is formulated by them under the teachings of French Pat. 1,400,917. In general, such coating formulation may comprise dilute solutions of polyvinyl alcohol, an emulsified polyolefin and an acid compound. For purposes of identification herein of such example of a coating applied at the "cold" end, the same will be referred to herein by its trade name of "AP" coating.

The metal oxide coating applied at the "hot" end by the apparatus and method of this invention is preferably formed by the decomposition of a metal compound such as a metal salt, e.g. stannous chloride, stannic chloride, titanium tetrachloride, etc., a metal organic such as tetraisopropyl titanate, and the like. Stannic chloride is a preferred agent for use at the "hot" end and the examples given herein will relate to the same as an example of an agent to provide a heat decomposable material to provide a metallic oxide bond on the glassware. Also in connection with stannic oxide, anhydrous stannic chloride is employed as the reagent for supplying stannic oxide to the external surface of the glassware. Such anhydrous stannic chloride is readily available and is stable when kept away from moisture, such as wet air. Stannic chloride decomposes with the latent heat in the glassware from the glassware residual heat of formation to form stannic oxide.

A primary object of this invention is to control the location of deposit as well as uniformity of deposit of stannic oxide on the glassware. Areas concerning which it is desired to eliminate deposit of stannic oxide is on the finish and preferably from the shoulders and neck of the glassware. The term finish, as used herein, means: the top or closure part of a glass container including the pouring lip and the threads or other means of attaching or inserting a closure. Any deposit of stannic chloride on such areas of glassware produces two difficulties making the product not commercially acceptable under standards possible with our invention. The first of these is an undesirable appearance defect and the second is a crown and cap corrosion problem.

When stannic chloride is applied at the "hot" end and in accordance with prior art practice of fogging the same into a hood and without directional control and exhausting the spent and/or excess fluid, frosty opaque spots appeared on the bottles. Apparently such spots resulted because anhydrous stannic chloride is hygroscopic and stannic chloride hydrate formed on portions of the glassware. Thus, an appearance defect resulted which was apparently accentuated by the fire flame polishers. However, with the novel method and apparatus herein later described, which will be now termed "laminar flow," the coating fluid (particularly if stannic chloride is used) apparently does not have sufficient time to attach itself to molecules of water that are present as vapor in the air. This "laminar flow" method maintained the flow of stannic chloride below the neck and finish of the glassware and the spent fluid is directed to an exhaust system.

Also, if any of the stannic oxide becomes located on the finish of the glassware, there results a metallic coated finish on the glassware, which with a subsequently superimposed cap or crown of a different metal, results in cap or crown corrosion problems even during normal expected shelf life of the capped or crowned glassware.

The foregoing mentioned specific objects of this invention, together with others inherent in the same, are obtained by the structure and method illustrated in the accompanying drawings throughout which like reference numerals indicate like parts.

FIG. 2 is a view on an enlarged scale over FIG. 1 showing generally, apparatus of this invention;

FIG. 3 is a fragmentary plan view, with parts broken away, illustrating this invention;

FIG. 4 is a fragmentary view taken substantially on broken line 4—4 of FIG. 3;

FIG. 5 is a fragmentary sectional view illustrating apparatus for mixing the stannic chloride with air to be delivered as a coating material in accordance with this invention;

FIG. 6 is a perspective fragmentary view in elevation illustrating apparatus of this invention at one side of the conveyor; and FIG. 7 is a schematic view illustrating operative parts of this invention.

Figure 1:
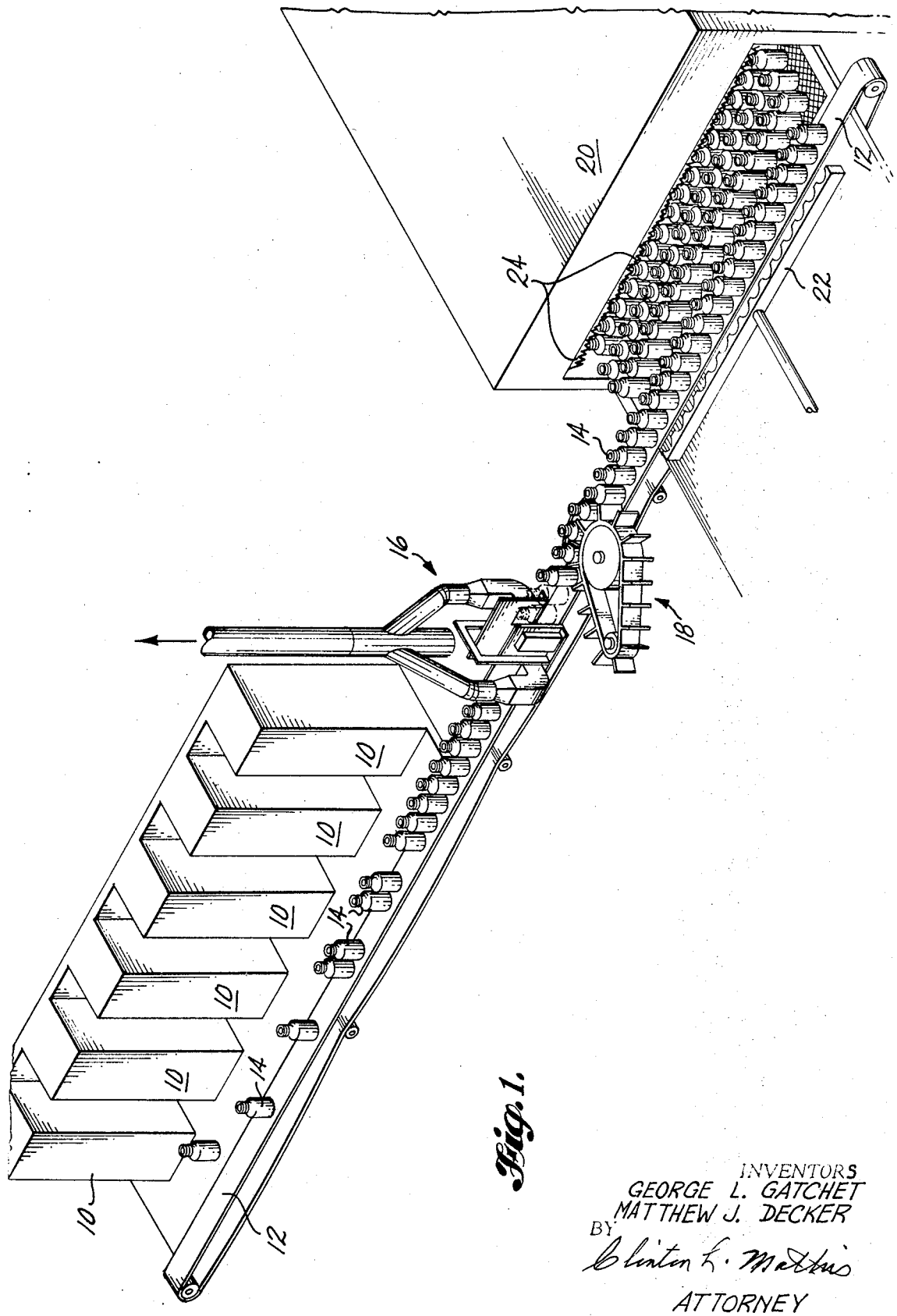
FIG. 1 is a perspective view illustrating generally: portions of a glassware forming machine delivering glassware, as stubby beer bottles, to a conveyor; substantially centrally, an illustration of this invention; and then a bottle separator and annealing lehr.

Referring now to FIG. 1 of the drawings, a glassware forming machine is indicated schematically and there is illustrated a plurality of sections 10, each of which is for forming glassware. It is common to provide glassware forming machines in a number of sections in the interest of substantial production. The glassware delivered by said sections 10 is at very high elevated temperatures and is relatively close to the temperature at which the glassware is form sustaining and in the order of an excess of 800° F.

The glassware formed in the sections 10 is delivered by conventional means (not shown) onto and with the same resting on their bottoms on take-away conveyor 12. As the glassware on conveyor 12 may be in the form of "stubby" beer bottles and such present difficult coating problems, the same are illustrated and described herein, by way of example, and such bottles 14 are shown on said conveyor 12 in FIG. 1 of the drawings.

As the said bottles 14 travel on the conveyor 12 of FIG. 1 and in the direction from left to right, the said bottles 14 are exposed to treatment by the coating apparatus of our invention, indicated generally by 16. During such travel, the bottles 14 pass through the said coating apparatus 16 and then encounter the usual bottle-timing mechanism 18. This mechanism 18 is in common usage and determines that the bottles 14 are of sufficient number and have sufficient spacing so that they may be appropriately moved into annealing lehr 20.

Schematically a pusher mechanism 22 is shown so that the same will engage a plurality of bottles 14, such as sixteen, so that the same may be moved as a unit, crosswise of the length of the unit, and there will be the right number of bottles and with the proper spacing so that all sixteen can be moved with one stroke of the pusher 22 off the conveyor 12 and as a unit into the annealing lehr 20.

As the bottles enter the annealing lehr 20, each bottle 14 is contacted by a fire polisher 24. In accordance with usual practice, flame from fire polishers 24 intentionally envelopes the finish, and inherently the neck and shoulder portions of the bottles to provide for the desired fire polish finish on each bottle.

Referring now more particularly to FIGS. 2, 3, 4, and 6 of the drawings, one of the bottles on conveyor 12 is indicated at bottle location 15 to locally identify the same and the next succeeding bottle, in line of travel, on conveyor 12 is indicated at bottle location 17 for the same purpose. The bottle passing location 17 has one side (the upper side as viewed in FIG. 3) directly in line with coating material sprayed from sprayer head 26 and a bottle at the location 15 has the diametrically opposite side of the bottle (the lower side as shown in FIG. 3) sprayed by the sprayer head 28. The spray from sprayer head 26 is alined directly with the exhaust opening 30 and the spray from sprayer head 28 is alined with the exhaust opening 32.

Now referring to FIG. 6 of the drawings, one of the sprayer heads, as sprayer head 26 is shown in elevation and the openings 34 are disposed in a rectangular pattern of a height to positively determine that the material sprayed on a bottle 14 (see FIG. 4) is confined so that the same coats only the body portion of a bottle 14 and the finish and the neck and shoulder portions of the bottle 14 are not coated. This selective and precise coating of the bottle is novel with applicants and is necessary in order to provide a commercially acceptable bottle under standards available with this invention.

Also, the fluid, which is directed by the sprayer head 26, is directed under a predetermined desired pressure, such as 5–10 p.s.i. fluid pressure of material in the sprayer head 26. Desired thickness of coating is applied to the bottles 14. Coatings of varying thicknesses of stannic oxide on glassware will appear as heavy iridescent bands. Too thick coatings provide an iridescent coating even though evenly applied. It has been found that an optimum uniform coating thickness giving maximum surface protection is available and that the same is less thickness than the thickness at which iridescence first appears.

As the fluid is forced crosswise of conveyor 12 and of a bottle 14 (as is best illustrated in FIG. 4 of the drawing), the spray from head 26 is alined with the exhaust opening 30 connected with a source of negative pressure. The amount of such negative pressure is to ensure a crosswise flow of the fluid being sprayed onto the bottle and with the spray flowing in a pattern to wrap itself around a bottle 14 in a confined path or layer or to envelope and flow in close proximity to the external surface of a bottle 14, which is illustrated in FIG. 4 of the drawings and which is termed herein as laminar flow. It is very important in our invention that the fluid sprayed on the bottle be controlled by being urged in a pattern which is substantially rectangular and has a substantial height relative to its width and which directs the fluid being sprayed in an area which will not include the finish and neck and shoulder portions of a bottle and which will specifically avoid the finish portion of a bottle. In order that the flow shall continue crosswise and thus in effect wrap the sprayed fluid around the bottle as described, the exhaust opening 30, connected with a source of negative pressure, is alined with the flow of fluid emitting from said rectangular shaped pattern of openings 34 of the sprayer head 26. It is also important in this invention that the spray from such a head be directed toward a source of negative pressure and with a heated bottle disposed therebetween to cause such laminar flow of the fluid being sprayed so that there is positive control of the direction of flow and the area of contact of the spray with the bottle.

After one side of a bottle has been sprayed, as the bottle passes bottle location 17, then such a bottle passes bottle location 15 and then the diametrically opposite side of the same bottle is sprayed and this time by a sprayer head 28 which directs its spray towards the exhaust opening 32, connected to a source of negative pressure, and with the bottle passing bottle location 15 and between the sprayer head 28 and the exhaust 32. The sprayers 26 and 28 may be identical and likewise the exhaust openings 30 and 32 may be identical, thus providing for the same application of coating material directly toward each bottle and from diametrically opposed positions.

Referring now particularly to FIG. 6 of the drawings, conduit 36 has passing therein the coating fluid, described herein as stannic chloride and dry air—such air will be here termed as primary air for purposes of differentiation as will appear. Also, it is desirable to add additional air (which may be wetter than said primary air) to the fluid of air and stannic chloride in conduit 36, and thus there is employed a conduit 38 which connects to another source of air which will term secondary air for purposes of differentiation. A mixing chamber 40 mixes the stannic chloride and primary (dry) air with secondary (wetter) air and we have found that unless the mixing chamber 40 and the associated sprayer head 26 are maintained at a relatively hot temperature, that there is a white precipitate formed from the stannic chloride. This precipitate tends to cause difficulties, as plugging of the openings 34. However, if said mixing chamber 40 and the said sprayer head 26 are maintained at a high temperature, then no difficulties are encountered during operation because of the absence of white precipitate at this area. One way of causing such parts to assume a higher temperature (and to utilize heat inherently retained by the newly formed bottles at the "hot" end) is to place the said mixing chamber 40 and its associated sprayer head 26 in close proximity to the passing bottles 14, which retain their heat of formation and at this stage have a temperature in excess of 800° F. In order to enhance the heated condition of said sprayer head 26 and mixing chamber 40 and to compensate for the cooling of them, which is effected by the passage of air in conduits 38 and 36, a heat exchanger in the form of a coil 90 may be employed and with such heat exchanger 90 disposed relatively close to the path of travel of the bottles 14 on conveyor 12.

In all probability the white precipitate is formed in view of the fact that the initial material employed to provide stannic chloride is anhydrous stannic chloride. One way of preventing the formation of a white precipitate from such material is to expose the same only to relatively dry air. We have found that the formation of such a white precipitate from such material may also be prevented in the spray head and while bottles are being coated if the mixing chamber 40 and the sprayer head 26 are sufficiently heated and thus we can use relatively large quantities of secondary air and the same need not be too relatively dry.

The discussion in connection with the mixing chamber 40, sprayer head 26, and the parts and openings thereof, is equally applicable to the unit at the other side of the machine comprising the sprayer head 28 and its associated mixing chamber 41 and thus are incorporated by reference without unnecessary repetition.

A wall 39 disposed along one side of conveyor 12 supports exhaust opening 32, sprayer head 26 and mixing chamber 40 and wall 43 supports exhaust opening 30, sprayer head 28 and mixing chamber 41. The walls 39 and 43 enclose the spraying and orient the sprays and the sprayer heads from external air disturbances and further maintain temperatures at the zoned areas.

Now referring to FIG. 5 in connection with said FIG. 6 of the drawings, the physical relation between the conduits 36 and 38 is indicated so that as secondary air (at higher volume and pressure) in conduit 38 passes through conduit 36 (carrying stannic chloride and air at a lower pressure) and into mixing chamber 40, there is a venturi effect or action and such air pressure in conduit 38 not only increases the air pressure at the sprayer head 26 but tends to reduce pressure in the conduit 36 and thus provides a pumping action and increases the flow of fluid in said conduit 36 by the venturi effect mentioned.

The exchaust openings 30 and 32 are connected respectively with conduits 44 and 46 and in turn said conduits 44 and 46 are connected with a common conduit 48 which in turn is connected to a negative source of pressure so that spent and/or used exhaust gases are removed from the system where they may be transferred to any suitable location for their disposal. At times, white precipitate may be drawn off by the exhaust openings 30 and 32 and if the same should rise in the common conduit 48, then there is a clean-out conduit 50 having a removable cover (not shown) so as to facilitate removal of any white precipitate which may be formed and there deposited.

Now referring to the schematic showing of FIG. 7, a source of air 52 is provided with relatively clean and relatively dry air. Such air passes from said source 52 through controllable shut-off valve means 54 to conduit 56. Air from said conduit 56 is delivered to air dryer 58. Here the air is dried to a very high degree, such as to a dew point of −80° F. The purpose of such drying is to prevent precipitation of a white precipitate when such air is later mixed with anhydrous stannic chloride (which is hygroscopic). The air leaving dryer 58 preferably passes via pressure regulator 60 to provide a source of air at predetermined pressure. The air exhausting from pressure regulator 60 may be in the order of 10 p.s.i. The air from pressure regulator 60 passes to solenoid controlled valve 62; the operation of such valve is responsive to changes in temperature. The sensing element 61 of the solenoid controlled valve 62 is disposed in one of the exhaust openings 30 or 32. Thus, if heated bottles 14 are not present so that the spray from sprayer head 26 or 28 is not carrying heat with it from bottles as being directed toward one of the exhausts 30 or 32, then the temperature of the air in the exhaust opening 30 or 32 carrying such sensing element 61 will drop and this drop in temperature will cause the solenoid valve 62 to close and thus cut off the supply of primary air which is being delivered from the source 52 to the said solenoid valve 62. The gauge 63 is employed for the obvious purpose of permitting visual observation of the pressure in the conduit leaving pressure regulator 60.

Primary air leaving the solenoid control valve 62 passes to conduits 64 and 66. One of the said conduits, conduit 64, will eventually feed the stannic chloride coating fluid to the sprayer head 26 and the other, conduit 66, will feed stannic chloride fluid to the other sprayer head 28. Following the apparatus involved in connection with the conduit 64 and ultimately the sprayer head 26, the primary dried air in conduit 64 passes to flow meter 68. The flow meter 68 has a capacity range of 0–10 s.c.f.h. (standard cubic feet per hour) and eventually controls the stannic chloride flow by regulating the flow of primary air through said flow meter 68 to the stannic chloride storage tank 70. With the pressure regulator 60 set at ten p.s.i., then an operable range to adjust the flow meter 68 will be between 4 and 6 s.c.f.h. Thus, the flow of dried primary air and stannic chloride will be relatively low and only limited quantities of primary dried air are needed. Also, the thickness of the coating applied by the sprayer head 26 is controlled by the setting or adjustment of the flow meter 68.

The air leaving flow meter 68 preferably passes through a check valve 72 which permits flow only in the direction of from the flow meter 68 to the valve 74 but prevents flow in the reverse direction. This is to prevent any of the stannic chloride in the stannic chloride tank 70 from passing in the reverse direction past check valve 72 and to parts previously in the line of travel of the air to said check valve 72. Valve means 74 is in the nature of an inlet valve to tank 70 and valve means 76 is an outlet valve. Thus, the two valves can be turned off at any time if it is desired to replace the tank 70 or to fill the said tank. Stannic chloride with dried primary air therein is delivered from valve 76 via conduit 36 to the mixing chamber 40.

It is desired that no more air than is necessary be mixed with the stannic chloride from tank 70 and that all such air that is used is dried to a very dry condition, such as −80° F. dew point temperature. However, in order to provide the necessary volume of air at the sprayer head 26, secondary air is employed to feed into the mixing chamber 40 and this may be accomplished by air from source conduit 56 connected to conduit 78, thence through regulator valve 80 and along conduit 82. Conduit 82 connects with shut-off valve 84. A pressure gauge 86 is provided for sight observation of the pressure in conduit 82. The pressure regulator valve 80 may be similar in construction and mode of operation of the previously described regulator valve 60. The regulator valve 80 may be set at an outlet pressure regulation of 5 to 10 p.s.i. and the pressure in conduit 88 will be relatively high as compared to the pressure passing inlet valve 74 to stannic chloride tank 70 because of the setting of the flow meter 68. The setting of the flow meter 68 should be in the order of about 4 to 6 standard cubic feet per hour and hence there will be relatively low pressure in the conduit 36 leading to mixing chamber 40 so far as the pressure in the conduit 88 which feeds heat exchanger 90. The heat exchanger 90 is the counterpart of the heat exchanger 42 (previously described) and the discharge end of said heat exchanger 90 will be conduit 38 previously described).

All of the air which was involved in delivering air to the conduit 36, including air passing through stannic chloride tank 70, was relatively very dry air, such as −80° F. dew point air. However, such air may be employed in minimum quantities whereas the total amount of air necessary for the mixing chamber 40 will be a relatively large volume of air. Thus, in the interest of economy, the air (secondary air) which passes along conduits 56, 78, 82, 88, and heat exchanger 90 may be wetter air provided that enough heat is employed with such air when such air is utilized in the mixing chamber 40. Also, in the interest of economy, the heat exchanger 90 is employed along with heat adjacent the mixing chamber 40 and sprayer head 26 and the heat utilized in the heat exchanger is the heat which is inherently present from the heat of formation in bottles 14. While dried air dried to a dryness of that employed in the primary air might be used, there is a savings effected by the use of the heat exchanger 90 and the heating of mixing chamber 40 and sprayer head 26 by the said heat of formation of the bottles 14 which is inherently present at the "hot" end of the usual glass line.

Now considering the feeding of primary dried air and stannic chloride solution to the mixing chamber 41 having associated sprayer head 28, the feed will be through conduit 66, flow meter 92, check valve 94, inlet valve 96, stannic chloride tank 98, outlet valve 100, and conduit 102, each of which will function similarly to the respective parts previously described as conduit 64, flow meter 68, check valve 72, inlet valve 74, stannic chloride tank 70, outlet valve 76, and conduit 36.

The secondary air to be delivered to the heat exchanger 42 and in turn to deliver heated secondary air to the mixing chamber 41 associated with the other sprayer heads 28 may be traced as follows: conduit 104, regulating valve 106, conduit 108, shut-off valve 110 (the pressure being indicated by pressure gauge 112), conduit 114, heat exchanger 42, and conduit 116, which in turn are the counterparts respectively of conduit 78, regulator valve 80, conduit 82, shut-off valve 84 (the pressure being indicated by pressure gauge 86), conduit 88, heat exchanger 90, and conduit 38 previously described. Thus, primary air and stannic chloride will be fed from conduit 102 to the mixing chamber 41, whereas secondary air and at a higher velocity and larger volume will be fed to said mixing chamber 41 via conduit 116 and the fluid thus emitted from the sprayer head 28 is from structure and mode of operation similar to the structure and mode of operation described in connection with the emission of the spray material from the other sprayer head 26.

Glassware containers are normally supported on their bases and when so supported, the glassware containers may contact each other at their body portions. Thus, the area of the glassware containers to be protected by coating against normal usage is the body portions of the glassware containers. Contact between glassware containers will result in external surface damage of the glassware in the form of abrasions, bruises, and scratches, causing loss of tensile strength of the glassware. Thus, the critical area of glassware containers which needs a protective coating is the body portion.

Substantially all glassware containers have in addition to a body portion, a finish portion against which a lid, cap, or crown is placed to seal the container. In many instances this finish is provided with a fire flame finish at the "hot" end in the manufacture of glassware. If said finish is coated at said "hot" end and then subsequently the fire flame finish is provided, the effect of the fire flame on said coated finish becomes a factor in making the glassware commercially unacceptable. We have found that undesirable results obtain if the finish is coated, either with or without subsequent fire flame finish and results in cap or crown or lid corrosion problems. Also, in the event that a metal cap or crown or lid is used and the same is of the type to be twisted or turned or crimped into locked position against the finish and there is frictional engagement or rubbing of the coated finish with the cap or crown, the corrosion problem is enhanced. Thus, in our invention, we positively control the area of coating of the glassware at the "hot" end to avoid coating the finish and substantially limit the coating to the body portion of the glassware container.

Also, in many glassware containers there are shoulder and neck portions—the neck portions varying in area, such as the variation between ordinary beer bottles and stubbys. When a fire flame finish is applied to such bottles, a fire flame, as one derived from a gas burner, provides the flames which are directed downwardly and directed toward and enveloping the finish. Such flames inherently envelop not only the finish but also the neck and shoulder portions of the bottles. If said neck and shoulder portions have been previously coated at the "hot" end of the glassware manufacture, prior to such flame finish, then spotty, frosty, and opaque coatings appear. Such spotty, frosty, and opaque coating effects are augmented or produced by the flames contacting such neck and shoulder portions during fire flame finish of the containers.

Test data also leads us to the conclusion that a combined "hot" and "cold" end coating provide for the best umbrella for protecting the virgin glass surface. The results obtained from the combination treatment of the same bottle at both the "hot" and "cold" ends are substantially more than the mathematical sum of the separate results of "hot" and "cold" end treatment of different bottles. We therefore conclude that a synergistic action developes from the combined coatings to the same bottle. The following table reviews this synergistic behavior when stannic oxide is used as the "hot" end coating and the said AP coating is used as the "cold" end coating.

| Coating | Pressure strength | Percent increase |
| --- | --- | --- |
| (1) No coating | 178 #/sq. in.[1][2] | |
| (2) Stannic oxide [3] | 184 #/sq. in.[1][2] | 3 |
| (3) AP | 261 #/sq. in.[1][2] | 46 |
| (4) Stannic Oxide and AP [3] | 326 #/sq. in.[1][2] | 83 |

[1] Samples are wet abraded for one minute in a line simulator prior to pressure testing.
[2] A.S.T.M. standard destructive pressure test.
[3] Stannic chloride flow meters at 4 s.c.f.h. each.

In the foregoing it will now become obvious that we have shown apparatus and a method of applying a metal coating on the external surface of hot glassware containers, such as bottles 14 passing bottle locations 17 and 15 while said glassware containers retain their heat of formation which they receive prior to being delivered from sections 10 onto conveyor 12. At this "hot" end in the glassware manufacture of bottles, such bottles retain a heat of formation in excess of 800° F. This heat of formation is retained by the bottles as they are carried on conveyor 12 and between walls 39 and 43 and when the bottles pass bottle station 17, each bottle has one side thereof (such as the upper side as viewed in FIG. 3) sprayed with a heat decomposable metallic compound and air (such as stannic chloride and air mixed in mixing chamber 40) emitted as a spray from sprayer head 26. This spray from the sprayer head 26 sprays against approximately one-half of the external surface area of the bottle 14 at bottle location 17 and because of the heat furnished by the bottles, which retain heat from their formation, the metallic containing fluid stream is decomposed by such heat and stannic oxide is deposited as a coating on one-half of the bottles 14 as they pass bottle location 17. The fluid stream is under positive pressure from the sprayer head 26 which is directed toward the exhaust opening 30 and the fluid flows in a path enveloping the surface of the bottle and the pattern of flow is limited by the negative pressure in the exhaust opening 30 so that the flow is in a pattern enveloping and in close proximity to the external surface of the container 14 and in a laminar flow or layer flow pattern. In view of the pattern of openings in the sprayer head 26 and the fact that each of the bottles 14 presents a similar object to be sprayed as the bottles have their bottoms resting on the conveyor 12, the rectangular pattern of openings in the sprayer head 26 provides a pattern of spray against one side of the bottles as they pass location 17 so that the bottles are coated on their body portions and with little, if any, spray on the shoulder portions of the bottles and neck and with positively no spray contacting the finish or upper surface of each of the bottles 14.

The heat decomposable metallic compound is illustrated by way of example of stannic chloride and the coating on the bottle deposited will be stannic oxide from such source. Obviously, other heat decomposable metallic compounds may be employed but we prefer to use stannic chloride because of the preference coating obtained therefrom by our invention.

Next, as the said bottles or containers 14 pass the bottle location 15, the diametrically opposite remaining side portion of each bottle or container 14, which has had one side coated as mentioned, is treated in the same way as that just described to completely coat the bottle with a layer of metallic oxide. Also, while the bottles are being sprayed as they pass bottle location 15, the same precision of coating the bottle body and limiting the coating on the neck and shoulder portions and the avoiding of all coating on the finish of the bottle obtains as the bottles pass the station 15 as the same occurred when the bottles passed station 17.

In the event that the preferred heat decomposable metallic compounds, as stannic chloride, is employed, then we illustrate apparatus and method most successfully, economically and judiciously employing the same. A principal source of obtaining stannic chloride is from anhydrous stannic chloride which is hygroscopic in nature and tends to form a white precipitate in the event that the same is contacted by air other than an extremely dry air. Thus, in order to cut down on the amount of dried air, such as dried to −80° F., the primary air furnished to the mixing chambers 40 and 41 contains relatively small amounts of dried air in combination with stannic chloride. Thus, all parts of the system prior to the said mixing chambers will be trouble free from forming a white precipitate because of the relatively dry air that is employed in connection with the stannic chloride. However, in order to obtain sufficient air to obtain the desired air-stannic chloride content, secondary air is employed and fed to each of the mixing chambers 40 and 41. This secondary air is provided at a time when the mixing chambers 40 and 41 and the parts which will be contacted by the fluid emitting from the sprayer heads 26 and 28 and while such fluid is between the walls 39 and 43 and at a temperature to prevent the formation of the white precipitate even though the secondary air furnished to the mixing chambers 40 and 41 from the secondary source is wetter air. This permits the system to employ large volumes of relatively wet air which otherwise than by its heated condition would cause the formation of a white precipitate which would interfere with the system, such as in clogging the openings in the sprayer heads 26 and 28.

In order to keep the pressure low in feeding the mixture of stannic chloride and dry air to the mixing chambers 40 and 41, we employ the conduits 36 and 38 (see FIG. 5) in relation to each other to form a venturi so that the relatively larger volume of air in conduit 38 and which is traveling at a higher velocity will cause a venturi effect or action in the conduit 36 and provide a pumping action so that during operation the desired quantities of dried air and stannic chloride will be fed through conduit 36 or through conduit 102 even though the flow meters 68 and 92 are regulated for relatively low flow, such as four to six s.c.f.h. This permits relatively low pressure operation in the conduits 36 and 102 and the inherent lesser problems of low pressure systems. Also, in the event of shut down of the apparatus, there is a low pressure system involved and much lower when the pumping or venturi action ceases.

Another feature of the invention which will be noted is that the heat employed in heating the mixing chamber 40, sprayer head 26, and heat exchanger 90 on one side of the conveyor 12 and the sprayer head 28, mixing chamber 41, and heat exchanger 42 on the other side of the conveyor is the heat furnished from the glassware retaining therein the heat of its formation and thus economies are effected in supplying heat from sources where the same is readily available.

Also, from the foregoing it will be readily apparent that we have provided an apparatus wherein we have illustrated a source of heat decomposable metallic compounds, such as stannic chloride, which provides for a metallic containing fluid stream which will pass through sprayer heads 26 and 28 to provide a direct flow of a metallic containing fluid stream which flows toward and around glassware 14 on a conveyor 12 and which spray is confined to a pattern of laminar flow by the negative pressure in the exhaust openings 30 and 32. By the rectangular pattern of the openings in the sprayer heads 26 and 28, the pattern of flow is directly on the body portions of the bottles 14 and at an elevation below substantially the necks and shoulders of the bottles 14 and is entirely free of the finish of the bottles. As the bottles which may take the form of stubby beer bottles or other containers where there is a fire finish as the bottles are processed in the annealing lehr 20, there is no coating on the finish of the bottles to be reacted upon by the flame finishers in the lehr 20. In the event that there is a coating on the finish of the bottles or other glassware containers, ten if such bottles or glass containers are later used in connection with caps, lids, or crowns, any metallic coating on the finish provides a corrosion problem in combination of such a coated bottle or glassware and the metal cap, lid, or crown.

As bottles are flame treated at the lehr, as lehr 20, the flames employed are intended to react with the finish of the bottles or glassware containers to provide for a finer finish thereof. However, it is impossible to confine the flames in such operation solely to the finish of the glassware and hence there is a flame treatment which will included not only the finish of the bottles or glassware but which will also include the necks and shoulder portions. If any of said portions are coated with a metallic coating, such as stannic oxide, then there will be reaction of the coating on such areas with the flame being employed for the flame finish. This will either cause appearance defects on the necks and shoulders or will cause corrosion problems by coating the finish. A metallic coated finish will be objectionable when used in connection with metallic caps, lids, or crowns, the latter objection resulting in cap or crown corrosion during subsequent use of the bottles or glassware containers.

Obviously, changes may be made in the forms, dimensions and arrangements of the parts of our invention without departing from the principle thereof, the foregoing setting forth only preferred forms of our invention.

We claim:

1. A method of applying a metallic coating on the external surface of a hot glassware container having body, neck, shoulder, and finish portions, while said container retains therein heat of its formation, comprising moving said container past and adjacent a first fixed station; directing at said first station a heat decomposable metallic compound and air as a metallic containing fluid stream under positive pressure horizontally and directly against one side of the external surface area of said container, decomposing said heat decomposable metallic fluid by the heat of formation retained in said container to provide a metallic coating on said container, and retaining said fluid stream in a horizontal laminar flow pattern enveloping and in close proximity to the external surface of the container by a negative pressure outlet located at a fixed second station, directly alined with the horizontal flow of said fluid stream under positive pressure, and disposed adjacent said container and at the other side thereof to coat the glassware body portion, to limit the coating of the neck and shoulder portions, and to avoid all coating of the finish portion thereof.

2. The method of claim 1 wherein the heat decomposable metallic compound is stannic chloride and the metallic coating on said container is stannic oxide.

3. The method of claim 1 wherein a similar metallic coating is subsequently applied to the other side of the external surface area of the same container by the same method.

4. The method of claim 1 wherein the metallic containing fluid stream under positive pressure comprises two streams initially separate and subsequently intermixed just prior to usage as the metallic containing fluid stream, one stream comprising anhydrous stannic chloride and air dried to a relatively low dew point temperature and the other stream comprising relatively wet air, of larger volume and heated to an elevated temperature just prior to mixing with the first stream.

5. The method of claim 4 wherein said other stream is a flow confined in one conduit and the said other stream is disposed in venturi relation to the flow of said one stream also in a confined flow in another conduit, thus causing a pumping action of the said one stream and the intimate intermixing of the outflow of both streams.

6. The method of claim 4 wherein the heat employed in heating said other stream is obtained from the heat of formation from said glassware containers.

7. The method of claim 6 wherein said other stream flows in a heat exchanger disposed in relatively close proximity to traveling glassware retaining therein the heat of its formation.

8. Apparatus for applying a metallic coating onto the external surface of a hot glassware container having body, neck, shoulder, and finish portions comprising, a source of heat decomposable metallic compound and air providing a metallic containing fluid stream flowing under positive pressure; a sprayer head comprising a pattern of outlet openings limiting the flow of said fluid stream to a predetermined pattern and in a horizontal direction; conveyor means disposed adjacent said sprayer head and conveying glassware containers retaining therein heat of their formation, through said fluid stream and with one side of the containers adjacent said sprayer head, whereby said heat decomposable metallic compound is decomposed by said heat of formation and metallic coatings are deposited on said containers; and a negative pressure outlet means alined with the fluid stream in said predetermined pattern and positioned adjacent said conveyor means and the other side of containers thereon to permit each of said glassware containers to pass between it and said sprayer head and through said horizontal fluid stream, said negative pressure confining flow of said fluid stream in a horizontal laminar flow pattern enveloping and in close proximity to the external surface of a container to coat the glassware body portion, to limit the coating of the neck and shoulder portions, and to avoid all coating of the finish prtion thereof.

9. The apparatus of claim 8 comprising in addition electronically controllable pressure means providing said metallic containing fluid stream flowing under positive pressure, and control means for said electrically controllable pressure means comprising a temperature responsive sensing element means disposed in the path of flow of said fluid stream passing said heated glassware containers and to said negative pressure outlet means, whereby upon the absence of heated glassware said sensing means will function to control said electrically controllable pressure means.

10. The apparatus of claim 8, comprising in addition a second source of heat decomposable metallic compound and air providing a second metallic containing stream flowing under positive pressure and flowing in a horizontal direction and opposite to that of the first mentioned fluid stream, said second source being disposed on the opposite side of the conveyor and sequentially in the direction of travel of the conveyor relative to those of the first mentioned source; a second sprayer head comprising a pattern of outlet openings limiting the flow of said second fluid stream to a predetermined pattern and in a horizontal direction opposite to the flow of the first mentioned fluid stream and across said conveyor; and a second negative pressure outlet means alined with the second fluid stream and positioned on the side of said conveyor opposite to the side where the first mentioned negative pressure outlet means is positioned, said second negative pressure outlet means confining the flow of said second fluid stream in a horizontal laminar flow pattern enveloping and in close proximity to the external surface of a container coated by said first mentioned fluid stream to coat the glassware body portion, to limit the coating of the neck and shoulder portions, and to avoid all coating of the finish portion thereof.

11. The apparatus of claim 8 wherein the pattern of said outlet openings of said sprayer head is rectangular and the height of said spray therefrom against said glassware coats the glassware body portion, limits the coating of the neck and shoulder portions, and avoids all coating of the finish portion thereof.

References Cited

UNITED STATES PATENTS

| | | | |
|---|---|---|---|
| 3,014,815 | 12/1961 | Lely | 65—60 |
| 3,093,508 | 6/1963 | Wartenberg | 65—60 |
| 3,195,501 | 7/1965 | Barkham | 118—324 |
| 3,353,514 | 11/1967 | Lyle | 65—30 |
| 3,438,803 | 4/1969 | Dubble et al. | 117—106 |

S. LEON BASHORE, Primary Examiner

E. R. FREEDMAN, Assistant Examiner

U.S. Cl. X.R.

65—30, 157, 159, 162, 163; 118—323, 324; 117—106, 124